US012752748B2

(12) United States Patent
Widgery et al.

(10) Patent No.: US 12,752,748 B2
(45) Date of Patent: Oct. 6, 2026

(54) AVIATION WHEEL CHOCK APPARATUS

(71) Applicant: CHECKERS INDUSTRIAL PRODUCTS, LLC, Broomfield, CO (US)

(72) Inventors: Greg Widgery, Broomfield, CO (US); Jacob Meister, Broomfield, CO (US); Austin Comer, Thornton, CO (US); Duncan Shallcross, Burgettstown, PA (US)

(73) Assignee: CHECKERS INDUSTRIAL PRODUCTS, LLC, Broomfield, CO (US)

( * ) Notice: Subject to any disclaimer, the term of this patent is extended or adjusted under 35 U.S.C. 154(b) by 385 days.

(21) Appl. No.: 18/462,304

(22) Filed: Sep. 6, 2023

(65) Prior Publication Data

US 2025/0074369 A1 Mar. 6, 2025

(51) Int. Cl.

*B60T 3/00* (2006.01)
*B60T 17/00* (2006.01)
*B64F 1/16* (2006.01)

(52) U.S. Cl.

CPC ................ *B60T 3/00* (2013.01); *B60T 17/00* (2013.01); *B64F 1/16* (2013.01)

(58) Field of Classification Search

CPC ............... B60T 3/00; B60T 17/00; B64F 1/16
See application file for complete search history.

(56) References Cited

U.S. PATENT DOCUMENTS

| | | | |
|---|---|---|---|
| 1,828,579 | A | 10/1931 | Snyder |
| 1,837,657 | A | 12/1931 | Fedderman |
| 1,971,402 | A | 8/1934 | Goss |
| 2,184,487 | A | 12/1939 | Clark |
| 2,477,265 | A | 7/1949 | Peck |

(Continued)

FOREIGN PATENT DOCUMENTS

| | | |
|---|---|---|
| GB | 6381995 | 7/2024 |

OTHER PUBLICATIONS

Elasco Products Elasglow Aircraft Chock (AAPA 1-page document, filed Nov. 4, 2024; and 2-pages Wayback machine; dated to at least Mar. 20, 2023—https://web.archive.org/web/20230320084904/http://elascoproducts.com/ (Year: 2023).*

(Continued)

*Primary Examiner* — Thomas W Irvin
(74) *Attorney, Agent, or Firm* — DORSEY & WHITNEY LLP

(57) ABSTRACT

An apparatus can include a wheel chock. The wheel chock can include a body portion. The body portion can include: a bottom face; a first side face and a second side face extending upward relative to the bottom face; at least one chocking face positioned above at least one of the first side face or the second side face, wherein the at least one chocking face includes an angled surface; and a spine forming a top surface parallel to the bottom face, the spine adjoined to the at least one chocking face, and the spine defining apertures. The wheel chock can also include a handle having a rigid portion, the handle being attachable to the body portion via the apertures. In some examples, the wheel chock further includes a high visibility material integrally formed with at least one of the body portion or the handle.

24 Claims, 6 Drawing Sheets

(56) References Cited

U.S. PATENT DOCUMENTS

| | | | | |
|---|---|---|---|---|
| 2,697,494 | A | 12/1954 | Parks | |
| 2,773,564 | A | 12/1956 | Ida | |
| 2,797,774 | A | 7/1957 | Richard | |
| 2,848,070 | A | 8/1958 | Wilson | |
| 2,954,101 | A | 9/1960 | Corson | |
| 2,992,704 | A | 7/1961 | Showker et al. | |
| 3,120,292 | A * | 2/1964 | Rambat | B60T 3/00 173/91 |
| 3,258,088 | A | 6/1966 | Bowen | |
| 3,317,006 | A | 5/1967 | Patterson | |
| 3,647,029 | A | 3/1972 | Hanley | |
| 3,661,229 | A | 5/1972 | Stonhaus | |
| 3,664,466 | A | 5/1972 | Rotheiser | |
| D229,330 | S | 11/1973 | Ray | |
| 3,800,917 | A | 4/1974 | Vick | |
| 3,810,530 | A | 5/1974 | Jay | |
| 3,947,213 | A | 3/1976 | Sodaro | |
| 3,973,651 | A | 8/1976 | Garrett et al. | |
| 3,993,167 | A | 11/1976 | Reed | |
| 4,144,951 | A | 3/1979 | Rea | |
| 4,186,823 | A | 2/1980 | White | |
| 4,476,961 | A | 10/1984 | Luigi | |
| D280,611 | S | 9/1985 | Nelson | |
| 4,594,021 | A | 6/1986 | Schaefer et al. | |
| 4,615,416 | A | 10/1986 | Wilson | |
| 4,694,936 | A | 9/1987 | Jackson | |
| 4,911,270 | A | 3/1990 | Hudson | |
| 4,917,219 | A | 4/1990 | Henry | |
| D315,542 | S | 3/1991 | Dalton et al. | |
| 5,028,015 | A | 7/1991 | Moses et al. | |
| 5,037,255 | A | 8/1991 | Bullock et al. | |
| D328,588 | S | 8/1992 | Mitchell | |
| 5,137,121 | A | 8/1992 | Leonard | |
| 5,586,621 | A | 12/1996 | Moon et al. | |
| 5,687,516 | A | 11/1997 | Sheehan et al. | |
| D397,986 | S | 9/1998 | Henry | |
| 5,803,208 | A | 9/1998 | Blach | |
| D402,616 | S | 12/1998 | Henry | |
| D404,001 | S | 1/1999 | Henry | |
| 5,874,491 | A | 2/1999 | Anders | |
| D407,059 | S | 3/1999 | Henry | |
| D410,887 | S | 6/1999 | Henry | |
| D412,481 | S | 8/1999 | Henry | |
| D415,463 | S | 10/1999 | Henry | |
| 5,984,570 | A | 11/1999 | Parashar | |
| D418,167 | S | 12/1999 | Stutsman | |
| D420,640 | S | 2/2000 | Henry | |
| D422,960 | S | 4/2000 | Henry | |
| D425,440 | S | 5/2000 | Franklin | |
| D448,338 | S | 9/2001 | Duvall | |
| 6,336,527 | B1 | 1/2002 | Metz | |
| 6,390,245 | B1 | 5/2002 | Metz | |
| D460,013 | S | 7/2002 | Spiller | |
| D461,138 | S | 8/2002 | Spiller | |
| D463,868 | S | 10/2002 | Foster | |
| 6,467,586 | B2 | 10/2002 | Agtuca | |
| 6,626,605 | B1 * | 9/2003 | Dean | F16B 7/0413 403/379.6 |
| 6,681,901 | B2 | 1/2004 | Agtuca | |
| D516,268 | S | 2/2006 | Gaster | |
| 7,000,740 | B2 * | 2/2006 | Chrisco | B60T 3/00 188/32 |
| 7,040,461 | B2 | 5/2006 | Chrisco et al. | |
| D552,527 | S | 10/2007 | Wolfram | |
| 7,284,641 | B1 | 10/2007 | Spence, III | |
| 7,299,902 | B2 | 11/2007 | Thorpe | |
| D625,677 | S | 10/2010 | Robbins et al. | |
| 8,119,933 | B2 * | 2/2012 | Auray | H01R 13/745 403/197 |
| 8,443,945 | B2 | 5/2013 | Perkins | |
| 8,851,240 | B1 | 10/2014 | Scoggins | |
| D746,187 | S | 12/2015 | Park et al. | |
| 9,212,797 | B2 | 12/2015 | Jeong | |
| 9,751,702 | B1 | 9/2017 | Hoofard et al. | |
| D812,779 | S | 3/2018 | Bonk | |
| 10,179,572 | B2 | 1/2019 | Metz et al. | |
| D852,716 | S | 7/2019 | Anderson et al. | |
| D862,270 | S | 10/2019 | Povoli | |
| 10,501,058 | B2 | 12/2019 | Rancourt et al. | |
| D873,196 | S | 1/2020 | Harrington | |
| D902,762 | S | 11/2020 | French | |
| D920,881 | S | 6/2021 | Sheehan | |
| 11,046,298 | B1 | 6/2021 | Desmarais et al. | |
| D926,104 | S | 7/2021 | Joel et al. | |
| 11,090,988 | B2 | 8/2021 | Huffman | |
| 11,097,697 | B2 | 8/2021 | Hu | |
| 11,260,834 | B2 | 3/2022 | Metz et al. | |
| 11,618,418 | B2 | 4/2023 | Widgery | |
| D999,550 | S | 9/2023 | Wang et al. | |
| 12,145,555 | B2 * | 11/2024 | Rodriguez-Cruz | B60T 3/00 |
| D1,089,038 | S * | 8/2025 | Widgery | D12/217 |
| D1,099,000 | S * | 10/2025 | Widgery | D12/217 |
| 2002/0005321 | A1 | 1/2002 | Agtuca | |
| 2003/0047391 | A1 | 3/2003 | Ericson | |
| 2004/0108172 | A1 | 6/2004 | Fox | |
| 2004/0216965 | A1 | 11/2004 | Scheffer | |
| 2004/0226780 | A1 | 11/2004 | Olson et al. | |
| 2005/0034934 | A1 | 2/2005 | Horton | |
| 2006/0011422 | A1 * | 1/2006 | Chrisco | B60T 3/00 188/5 |
| 2006/0060429 | A1 | 3/2006 | Malinowski | |
| 2008/0230329 | A1 | 9/2008 | Slager | |
| 2008/0264734 | A1 | 10/2008 | Walter | |
| 2008/0277211 | A1 | 11/2008 | Wolfram | |
| 2009/0245962 | A1 | 10/2009 | Anderson et al. | |
| 2010/0140024 | A1 | 6/2010 | Wolfram | |
| 2010/0260586 | A1 | 10/2010 | Hahn et al. | |
| 2011/0168501 | A1 | 7/2011 | Henry | |
| 2011/0290596 | A1 | 12/2011 | Perkins | |
| 2014/0014445 | A1 | 1/2014 | Talynn | |
| 2014/0188334 | A1 | 7/2014 | Foster | |
| 2015/0033614 | A1 | 2/2015 | Allbright | |
| 2017/0008498 | A1 | 1/2017 | Metz et al. | |
| 2017/0043751 | A1 | 2/2017 | Saltzman et al. | |
| 2017/0259792 | A1 | 9/2017 | Austin | |
| 2017/0282645 | A1 * | 10/2017 | Hight | B66F 3/005 |
| 2018/0086320 | A1 | 3/2018 | Jette et al. | |
| 2019/0202418 | A1 | 7/2019 | Waddell | |
| 2019/0299943 | A1 | 10/2019 | Gregory | |
| 2019/0329994 | A1 | 10/2019 | Ion | |
| 2021/0031736 | A1 | 2/2021 | Perozzo | |
| 2021/0061239 | A1 | 3/2021 | Milo et al. | |
| 2021/0170997 | A1 | 6/2021 | Widgery | |
| 2021/0213915 | A1 * | 7/2021 | Rodriguez-Cruz | B66F 3/08 |
| 2022/0185243 | A1 | 6/2022 | Metz et al. | |
| 2023/0114134 | A1 * | 4/2023 | Strauch | F16B 21/086 403/292 |
| 2024/0124155 | A1 | 4/2024 | Talapureddi et al. | |
| 2024/0326760 | A1 | 10/2024 | Jones | |
| 2025/0074369 | A1 | 3/2025 | Widgery et al. | |
| 2025/0074622 | A1 * | 3/2025 | Widgery | B64F 1/16 |
| 2025/0256861 | A1 * | 8/2025 | Widgery | B60T 3/00 |

OTHER PUBLICATIONS

Ironton Nylon Reinforced Rubber Wheel Chock—With Handle; Product for sale on Amazon.com; wayback machine dated to at least Sep. 8, 2015—https://web.archive.org/web/20150908182355/https://www.amazon.com/Ironton-Nylon-Reinforced-Rubber-Wheel/dp/B00PX0FP4I (Year: 2015).*

Elasglow Aircraft Chock. (n.d.). Elasco Products. Retrieved Nov. 4, 2024, from https://www.elascoproducts.com/images/art/ElasGlowChocks-DOC__1.pdf.

International Search Report and Written Opinion for PCT No. PCT/US2024/029862, mailed Sep. 24, 2024.

Rubber Aviation Wheel Chocks for Small to Large Airplanes and Aircraft. (n.d.). Checkers Safety Products. Retrieved Aug. 28, 2024, from https://checkers.justrite.com/wheel-chocks/rubber-aviation-wheel-chocks.

Urethane Aviation Wheel Chocks. (n.d.). Checkers Safety Products. Retrieved Aug. 28, 2024, from https://checkers.justrite.com/wheel-chocks/urethane-aviation-wheel-chocks.

(56) References Cited

OTHER PUBLICATIONS

Checkers Justrite Safety Group. Wheel Chocks. 2021. Retrieved from the Internet: https://checkers.justrite.com/media/mageplaza/product_attachments/attachment_file/c/h/checkers_wheel-chocks-overview-brochure_ck407-web_1.pdf.
CheckersTM Aviation Wheel Chock with Locking Rope, Ergo PU Cable Handle, 20"L x 8"W x 6-1/2"H. (n.d.). Global Industrial. Accessed May 25, 2025. URL: https://www.globalindustrial.com/p/aviation-wheel-chock-with-locking-rope-ergo-pu-cable-handle-20l-x-8w-x-6-12h.
International Search Report and Written Opinion for International Application No. PCT/US2025/013896, mailed Apr. 8, 2025.
International Search Report and Written Opinion for PCT/US2025/013988, mailed Mar. 25, 2025.
CheckersTM Aviation Chock with Loop Rope & Rubber Pad, PU Cable Handle, 19-1/2"L x 7-1/2"W x 6"H. (n.d.). Global Industrial. Accessed May 24, 2025. URL: https://www.globalindustrial.com/p/aviation-chock-with-loop-rope--rubber-pad-pu-cable-handle-19-12l-x-7-12w-x-6h.

* cited by examiner

AVIATION WHEEL CHOCK APPARATUS

FIELD

The described examples relate generally to wheel chocks. In particular examples, the disclosure relates to aviation wheel chocks with improved visibility and maneuverability.

BACKGROUND

Wheel chocks can include wedges of material to place closely against the wheels of a vehicle to prevent unintended movement or rotation of the wheels. In some examples, wheel chocks are used in combination with brakes (e.g., parking brakes) to prevent accidental movement of the vehicle when the vehicle is intended to remain stationary. Wheel chocks can be used in many different industries. In some examples, wheel chocks are used in the aviation industry to help maintain an aircraft in position (e.g., when parked in a hangar, during maintenance procedures, or when loading or boarding an aircraft). In other examples, wheel chocks are used in heavy industrial applications such as in mining, shipping, and construction in order to keep tractors, trucks, cranes, and other wheeled vehicles from moving when parked. In these or other examples, wheel chocks are used in many different weather conditions and times of day, including in the dark of night or during storms. Accordingly, there is a need for improved visibility of wheel chocks (e.g., to help operators, pilots, and drivers navigate towards a designated parking area or to help individuals assisting "on the ground" during the parking process to locate a wheel chock).

The subject matter claimed herein is not limited to examples that solve any disadvantages or that operate only in environments such as those described above. Rather, this background is only provided to illustrate one example technology area where some examples described herein may be practiced.

SUMMARY

An aspect of the present disclosure relates to an apparatus, such as a wheel chock. The wheel chock can include a body portion. The body portion can include: a bottom face; a first side face and a second side face extending upward relative to the bottom face; at least one chocking face positioned above at least one of the first side face or the second side face, wherein the at least one chocking face includes an angled surface; and a spine forming a top surface parallel to the bottom face, the spine adjoined to the at least one chocking face, and the spine defining apertures. The wheel chock can also include a handle having a rigid portion, the handle being attachable to the body portion via the apertures. In some examples, the wheel chock further includes a high visibility material integrally formed with at least one of the body portion or the handle.

In certain examples, the high visibility material includes a pigment having a color luminance greater than 50 percent. In at least one example, the high visibility material includes a chargeable light emissive material comprising at least one of a luminescent material, a phosphorescent material, or a radioluminescent material. In one example, the high visibility material includes a coating applied over at least one of the body portion or the handle. In a particular example, the high visibility material includes a discontinuous or weighted application of sprayed or printed material onto at least one of the body portion or the handle.

In some examples, the rigid portion of the handle maintains its shape and configuration. In one or more examples, the handle includes a pair of upright members and a crossbar adjoining the pair of upright members. In at least one example, the pair of upright members include a compressible tip. In specific implementations, the compressible tip defines a through-slot configured to allow deformation of the compressible tip when inserted through the apertures. In some examples, the compressible tip includes a tapered portion that, upon inserting through the apertures, includes an interference fit relative to the apertures to inhibit removal of the handle from the body portion. In one or more examples, the handle includes a slideable handle configured to slide up and down between a raised position and a lowered position. In at least one example, the wheel chock further includes a plurality of core outs defined between the bottom face and the top spine, wherein in the lowered position, upright members of the slideable handle respectively reside within two core outs of the plurality of core outs.

Another aspect of the present disclosure relates to a wheel chock apparatus. The wheel chock can include: a base engageable with a support surface; a first chocking face and a second chocking face positioned above the base, wherein the first chocking face and the second chocking face include angled surfaces; a spine forming a top surface, the spine adjoining the first chocking face and the second chocking face; and a chargeable light emissive material positioned across at least one of the first chocking face, the second chocking face, or the spine.

In some examples, the chargeable light emissive material includes at least one of a luminescent material, a phosphorescent material, or a radioluminescent material. In one or more examples, the chargeable light emissive material includes a glow-in-the-dark material. In certain examples, the wheel chock includes a rigid handle attachable to the spine.

Yet another aspect of the present disclosure includes a wheel chock apparatus. The wheel chock can include: a base; side faces extending upward relative to the base; a first chocking face and a second chocking face positioned above the side faces, wherein the first chocking face and the second chocking face include angled surfaces; a spine forming a top surface, the spine adjoining the first chocking face and the second chocking face; a slideable handle movably attached to the spine, the slideable handle comprising upright members and a crossbar, and the slideable handle being configured to translate up and down between a raised position and a lowered position, wherein in the lowered position, the upright members are positioned below the spine and the crossbar is positioned adjacent to the spine; and a chargeable light emissive material positioned across at least one of the side faces, the first chocking face, the second chocking face, the spine, or the handle.

In some examples, the slideable handle includes a mechanical stop configured to abut an interior portion of the wheel chock below the spine when the slideable handle is in the raised position. In one or more examples, the spine defines apertures formed in the top surface; and the slideable handle is press fit through the apertures. In particular examples, the chargeable light emissive material is configured to generate a luminous response perceivable to an unaided human eye when the chargeable light emissive material is exposed to temperatures below incandescence, the luminous response being configured to occur during oxidation or after exposure to light or other radiation.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
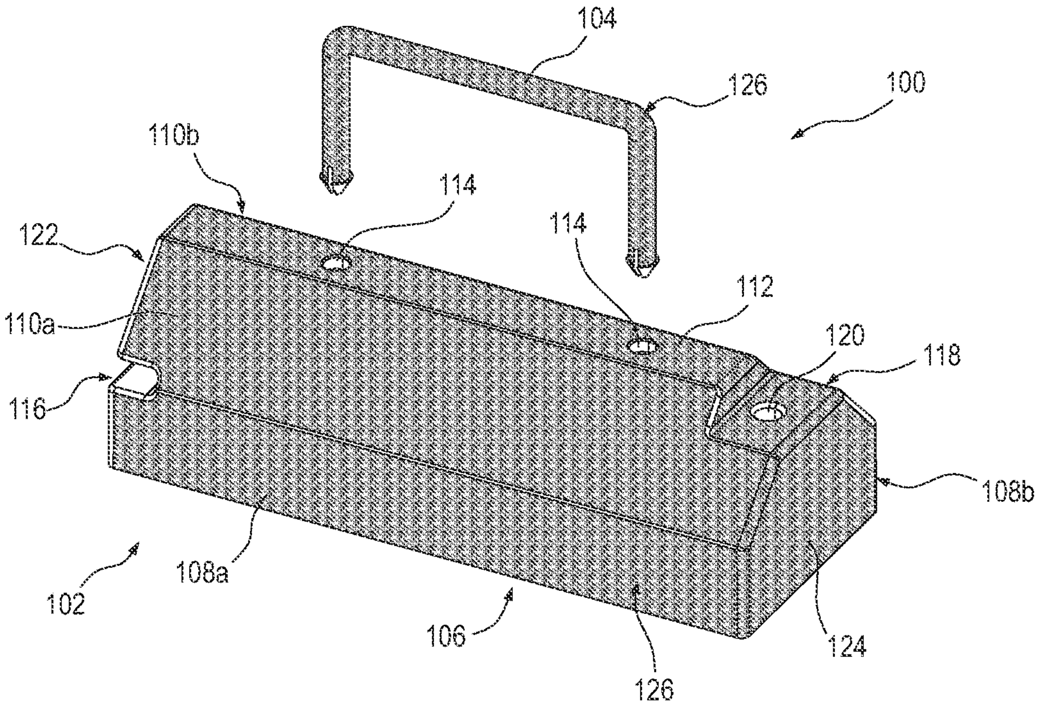
FIG. 1 illustrates an exploded perspective view of an example wheel chock in accordance with one or more examples of the present disclosure.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

The following disclosure relates to a highly visible wheel chock. In some examples the wheel chock includes a body portion. The body portion is sized and shaped to interface with a wheel (e.g., to prevent rotation or movement of the wheel). The body portion can include various faces or surfaces. Some faces provide a shape or height to the wheel chock. Additionally or alternatively, some faces engage with other objects (e.g., by contacting the ground surface, a wheel surface, etc.). It will be appreciated that these faces can include various features (e.g., to enhance grip or traction relative to an object or supporting surface).

In certain examples, a handle is attachable to the body portion. The handle can include one or more graspable members that can support the weight of the body portion (e.g., when carrying or positioning the wheel chock in place). In some examples, the handle is rigid to allow specific configurations or positions. For instance, in particular implementations, the handle is slideable up and down (e.g., to lower the handle out of the way when the wheel chock is in a chocking position against a wheel surface, and to raise the handle for carrying the wheel chock). A tipped portion of the handle inserted into the body portion can be compressible or form fit to an interior of the body portion. Additionally or alternatively, the tipped portion can include an interference fit or stop engageable with the body portion such that handle will not slide out or incidentally detach from the body portion.

In at least some examples, a wheel chock of the present disclosure includes a high visibility material. This high visibility material can include a myriad of different types of material (e.g., based on color luminance, photoluminescence, etc.). In some examples, the high visibility material can be integrally formed as part of the wheel chock, whether embedded in the body portion or the handle, or irremovably positioned over one or more surfaces of the wheel chock as a coating or spray-on application. In these or other examples, the high visibility material can lend to improved visibility of the wheel chock, particularly at night and/or during storms. Furthermore, in some examples, only the handle includes the high visibility material. In other examples, only one or more elements of the body portion include the high visibility material. Still, in other examples, the body portion and the handle both include the high visibility material.

The wheel chock can also include other features. For example, the wheel chock can include a hand grip (e.g., for using an extra hand to carry or positionally manipulate the wheel chock). As another example, the wheel chock can include a through-hole (e.g., for hanging or storing the wheel chock in a suspended position via the through-hole). In certain examples, the wheel chock can include a variety of core outs (e.g., to reduce material consumption, decrease a product weight, and/or tune an amount of allowed flexure or deformation for the wheel chock).

These and other examples are discussed below with reference to FIGS. 1-13. However, a person of ordinary skill in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 2:
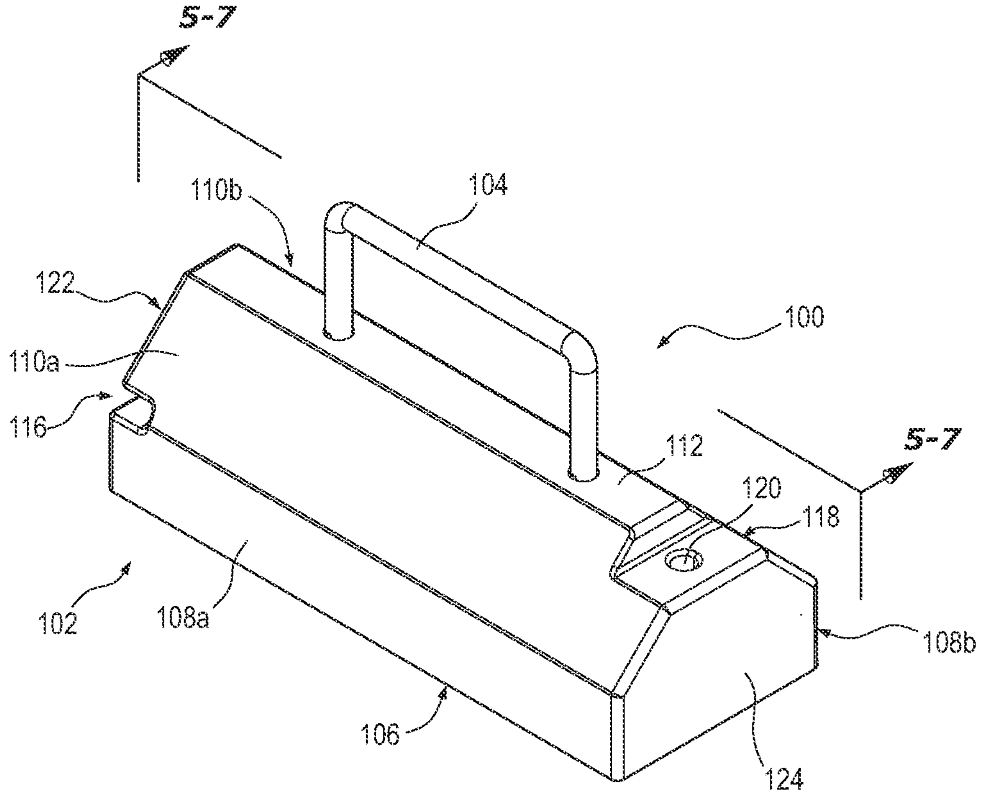
FIG. 2 illustrates a top perspective view of an example wheel chock in accordance with one or more examples of the present disclosure.
Figure 3:
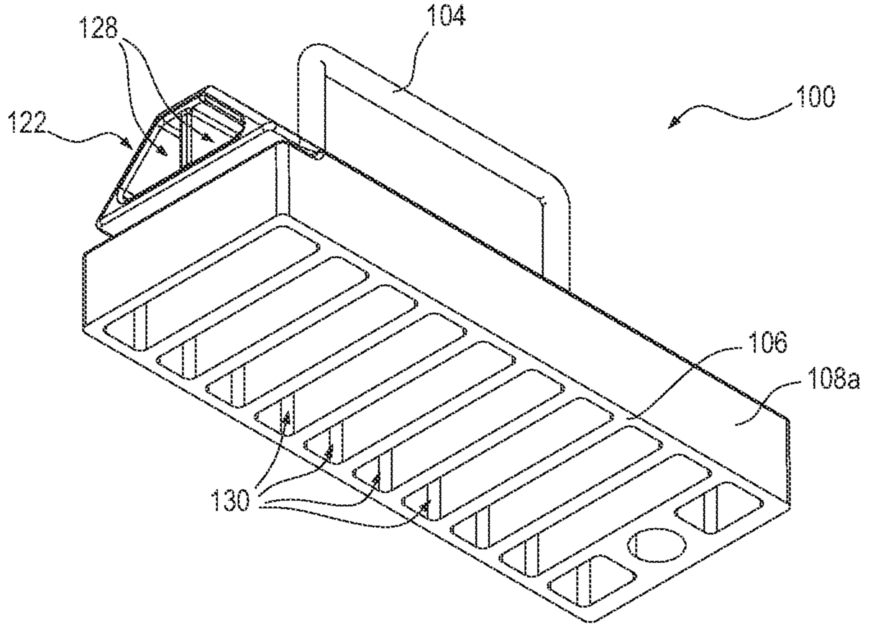
FIG. 3 illustrates a bottom perspective view of an example wheel chock in accordance with one or more examples of the present disclosure.

FIGS. 1-3 respectively illustrate an exploded perspective view, a top perspective view, and a bottom perspective view of an example wheel chock 100 in accordance with one or more examples of the present disclosure. As shown, the wheel chock 100 includes a body portion 102 and a handle 104. In some examples, the body portion 102 includes a structural frame, shell, and/or contact surfaces to engage and at least partially support a wheel of a vehicle (not shown). For example, a shape, size, and configuration of the body portion 102 can serve as a barrier or stop that prevents movement (e.g., rotational movement) of a vehicle wheel. Examples of a vehicle include an automobile, trailer, tractor, truck, crane, aircraft, and other wheeled vehicles. However, in some cases, a wheel chock of the present disclosure can also inhibit movement for non-wheeled vehicles (e.g., track vehicles like snowmobiles, track skid steers, etc.).

The body portion 102 can thus include a variety of different shapes and sizes, depending on the application and/or vehicle or wheel to be chocked. In certain examples, the body portion 102 is wedge shaped. In other examples, the body portion 102 is block shaped. Additionally or alternatively, the body portion 102 can include a solid material, while in other examples the body portion 102 can include hollow portions, cored out portions, one or more internal cavities, etc.

In these or other examples, the body portion 102 can include a plastic material, a rubber material, a metal material, a composite material, or a combination thereof. In certain examples, the body portion 102 includes a urethane material. Additionally or alternatively, the body portion 102 can include a material with impact resistance, toughness, and/or load-bearing capabilities sufficient for chocking a wheel of a vehicle. In at least some examples, the body portion 102 includes a molded material, a three-dimensional printed material, a cast material, a machined material, etc.

In more detail, the body portion 102 can include a bottom face 106 (i.e., a base) that is engageable with a support surface, such as the ground or field environment. In some examples, the bottom face 106 is flat or planar (as shown). However, in other examples, the bottom face 106 can include feet or other traction-enhancing features (e.g., ribs, spikes, protrusions, ridges).

The body portion 102 can also include side faces 108*a*, 108*b*. The side faces 108*a*, 108*b* can extend upward relative to the bottom face 106. In some examples, the side faces 108*a*, 108*b* are load-bearing surfaces (together with chocking faces 110*a*, 110*b*). In other examples, the side faces 108*a*, 108*b* are not load-bearing surfaces (but rather provide a height at which the chocking faces 110*a*, 110*b* can engage a wheel).

The body portion 102 can further include chocking faces 110*a*, 110*b*. A chocking face can include a wheel-engagement surface, a wedging wall, a stop surface, a contact surface, a tire-grip surface, etc. In particular implementations, the chocking faces 110*a*, 110*b* are angled surfaces (relative to the side faces 108*a*, 108*b*, which are positioned substantially vertical or perpendicular to a ground surface). In certain examples, the chocking faces 110*a*, 110*b* are angled between the vertical and horizontal angles (e.g., between 0 and 90 degrees from a vertical direction or plane associated with the side faces 108*a*, 108*b*). Further, the chocking faces 110*a*, 110*b* can include planar surfaces. Additionally or alternatively, the chocking faces 110*a*, 110*b* can include curved portions (e.g., with a curvature or radius corresponding to a radius of wheel). In some examples, the chocking faces 110*a*, 110*b* include traction-enhancing features (e.g., ribs, spikes, protrusions, ridges). Further, the chocking faces 110*a*, 110*b* can include a surface area and/or angle of inclination that is tunable depending on the application and/or vehicle or wheel to be chocked.

Other implementations of a chocking face are herein contemplated. For example, in some embodiments, the body portion 102 includes a single chocking face (as opposed to the multiple chocking faces illustrated). The single chocking face can be positioned above at least one of the side faces 108*a*, 108*b*. In some examples, the single chocking face adjoins a spine 112.

The body portion 102 can include a spine 112 forming a top surface of the wheel chock 100. In some examples, the spine 112 is parallel to the bottom face 106 and/or perpendicular to the side faces 108*a*, 108*b*. In these or other examples, the spine 112 can adjoin the chocking faces 110*a*, 110*b*. The spine 112 can also include one or more apertures 114. The apertures 114 can include through-holes for receiving the handle 104 (discussed more below).

The body portion 102 can further include a hand grip 116. The hand grip 116 can include a slotted portion defined by the body portion 102. In these or other examples, the hand grip 116 is positioned at an end 122 (opposite an end 124). In particular examples, the hand grip 116 allows a second hand for user in carrying or manipulating the wheel chock 100.

The body portion 102 can include core outs 128 adjacent to the hand grip 116 at the end 122. The core outs 128 can be sized and shaped to reduce material consumption, decrease a product weight, and/or tune an amount of allowed flexure or deformation for the wheel chock 100.

Additionally shown, the body portion 102 can include a relief 118 with a corresponding opening 120 (e.g., a through-hole for hanging the wheel chock 100 in a suspended position). Via the relief 118, a smaller pin or holder can be utilized to suspend the wheel chock 100 through the opening 120.

Similar to the core outs 128, the bottom face 106 can include one or more core outs 130. The core outs 130 can include slotted areas, cavities, voids, etc. that are formed (or subtracted via machining processes). The core outs 130 can be sized and shaped to reduce material consumption, decrease a product weight, and/or tune an amount of allowed flexure or deformation for the wheel chock 100. For example, increased webbing thickness or material dividing the core outs 130 can lend to increased rigidity (i.e., reduced flexibility) of the wheel chock 100, and decreased webbing thickness can lend to increased flexibility (i.e., reduced rigidity) of the wheel chock 100.

In addition to the body portion 102, the wheel chock 100 can include the handle 104. In particular examples, the handle 104 includes at least a rigid portion. In specific examples, the rigid portion of the handle constitutes an entirety of the handle 104 such that the handle 104 is a rigid handle. As used herein, the term "rigid" for a rigid portion or rigid handle refers to the inflexible or stiff qualities of the handle. For example, the handle 104 can maintain its shape and configuration (e.g., regardless of gravitational orientation or ambient weather conditions). Additionally or alternatively, a rigid portion can resist bending, deformation, or flexure. In this manner, the handle 104 can include a variety of advantages, particularly over loose, floppy rope-like tethers or handles. In particular, a rigid portion of the handle 104 can facilitate convenient and ergonomic grabbing, carrying, and/or manipulating the wheel chock 100. A rigid portion can also inhibit pinch points, entanglement, etc. that are typical of loose, floppy rope-like tethers. Further, and as will be described below, the rigid portion(s) of the handle 104 can allow for movement of the handle 104 between fixed positions—namely a raised position for carrying the wheel chock 100 and a lowered position when the body portion 102 is chocked against a vehicle wheel). These and other aspects of the handle 104 are described below in relation to FIGS. 4-7.

Other examples of the handle 104 are also herein contemplated. For example, the handle 104 can include a semi-rigid handle. As used herein, the term "semi-rigid" refers to a handle having a rigid portion (as described above) and another portion that is at least partially flexible or partially stiff. Additionally or alternatively, a semi-rigid handle can include a combination of stiff and flexible materials and/or a specific type of material exhibiting both stiff and pliant properties. For instance, as explained below in relation to FIGS. 14A-14C, a semi-rigid handle can include a first flexible portion (i.e., a semi-flexible core) and a second rigid portion (i.e., a stiffened sheath). Specifically, these semi-rigid handles can include a semi-flexible rope, cable, or chain at least partially encapsulated by a rigid, high visibility sheath. In these or other examples, a semi-rigid handle can similarly be moved between fixed positions (e.g., a raised position for carrying the wheel chock and a lowered position when the body portion 102 is chocked against a vehicle wheel).

In some examples, a semi-rigid handle can be at least temporarily deformed in response to an applied force. Additionally or alternatively, a semi-rigid handle can include a predetermined shape or configuration to which the semi-rigid handle is inherently biased. For example, flexible portions of a semi-rigid handle may bow or flex in response to grasping or lifting the semi-rigid handle, but then return to its predetermined (or unaltered) state.

Further shown in FIG. 1, the wheel chock 100 can include a high visibility material 126 (pictorially depicted as small dots or flecks across the wheel chock 100 in FIG. 1). Although not pictorially represented in other figures, the high visibility material 126 can likewise be included in one or more elements of a wheel chock shown in any figure of the present application.

As used herein, the term "high visibility material" refers to visibility-enhancing material or a visual aid. This high visibility material can include a myriad of different types of material (e.g., based on color luminance, photoluminescence, etc.). For example, the high visibility material 126 can include a pigment (e.g., a colorant) having a color luminance greater than 50 percent. Such pigment can correspond to a hue with a natural luminance above 50 percent. Additionally or alternatively, the color luminance can exceed 50 percent by modifying saturation and/or lightness of the pigment.

In some examples, the high visibility material 126 includes a chargeable light emissive material. As used herein, the term "chargeable light emissive material" refers to one or more elements capable of being charged (and recharged) to persistently emit light after exposure to light from a light source—with light energy or photons—that may be visible or invisible. In some embodiments, a chargeable light emissive material includes a mixture, alloy, or combination of elements with chargeable, light-emitting properties. A chargeable light emissive material can include a coating or layer (e.g., a dip coating or paint layer). A chargeable light emissive material can also include a discontinuous or weighted application of sprayed or printed material (e.g., particles, pigments, strips, layers, flecks, grains, drops, etc.). An example of a chargeable light emissive material includes luminescent materials (whether organic and/or synthetic)—including fluorescent materials, phosphorescent materials, and/or chemiluminescent materials. It will be appreciated that at least fluorescent materials promptly exhibit photoluminescence very shortly after photoexcitation of the fluorescent materials. Additionally, as some particular examples, a chargeable light emissive material includes ultraviolet phosphors, blue light emitting diode phosphors, infrared emitting phosphors, Anti-Stokes phosphors (i.e., up-converters), glow-in-the-dark phosphors, x-ray phosphors, and storage phosphors. Other examples of a chargeable light emissive material include radioluminescent materials and cathodoluminescent materials.

It will be appreciated that a chargeable light emissive material can include a glow-in-the-dark material (e.g., a material that generates a luminous response or "glowing" output after being excited, such as via UV radiation from the sun). Then, when positioned in a darker environment (e.g., a cloudy environment, a foggy environment, a stormy environment, a nighttime environment), the glow-in-the-dark material can at least temporarily maintain its excited state and correspondingly generate a luminous response (e.g., without the need to reflect environmental light). For instance, a glow-in-the-dark or phosphorescent material is a material that has a fluorescence for which the average lifetime of the excited atoms is greater than $10^{-8}$ seconds.

In particular examples, the high visibility material 126 can generate a luminous response (e.g., emit light at one or more wavelengths) perceivable to an unaided human eye when the chargeable light emissive material is exposed to an exciting agent at temperatures below incandescence. Such a luminous response can occur during oxidation or after exposure to light or other radiation. A luminous response can be modulated with electrical stimulation or other form of synthetic excitation in some examples (e.g., a high-intensity UV charging cabinet, a power supply connected to the high visibility material 126, a chemical agent, etc.). However, the high visibility material 126 can include materials that can generate a luminous response independent of synthetic excitation. Rather, the natural elements (e.g., sunshine) can be sufficient for the high visibility material 126 to generate the luminous response when the sunshine is gone.

In these or other examples, an "unaided human eye" is a naked eye of an average human observer having regular vision and that is not augmented or supplemented by lenses, microscopes, cameras, or other scopes or equipment used to discern wavelengths beyond the natural human eye. In certain examples, the luminous response of the high visibility material 126 may be visible to the unaided human eye in darker environments, particularly at night and/or during inclement weather. In some embodiments, the unaided human eye, as referred to herein, can detect light of wavelengths from about 342 nanometers to about 770 nanometers.

In some examples, the high visibility material 126 is integrally formed as part of the wheel chock (whether embedded in the body portion 102 or the handle 104, or irremovably positioned over one or more surfaces of the wheel chock 100 as a coating, molding, or spray-on application). In these or other examples, the high visibility material 126 can lend to improved visibility of the wheel chock 100, particularly at night and/or during inclement weather. Furthermore, in some examples, only the handle 104 includes the high visibility material 126. In other examples, only one or more elements (e.g., one or more surfaces) of the body portion 102 include the high visibility material 126. Still, in other examples (and as shown in FIG. 1), the body portion 102 and the handle 104 both include the high visibility material 126.

Any of the features, components, and/or parts, including the arrangements and configurations thereof shown in FIGS. 1-3 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 1-3.

Figure 4:
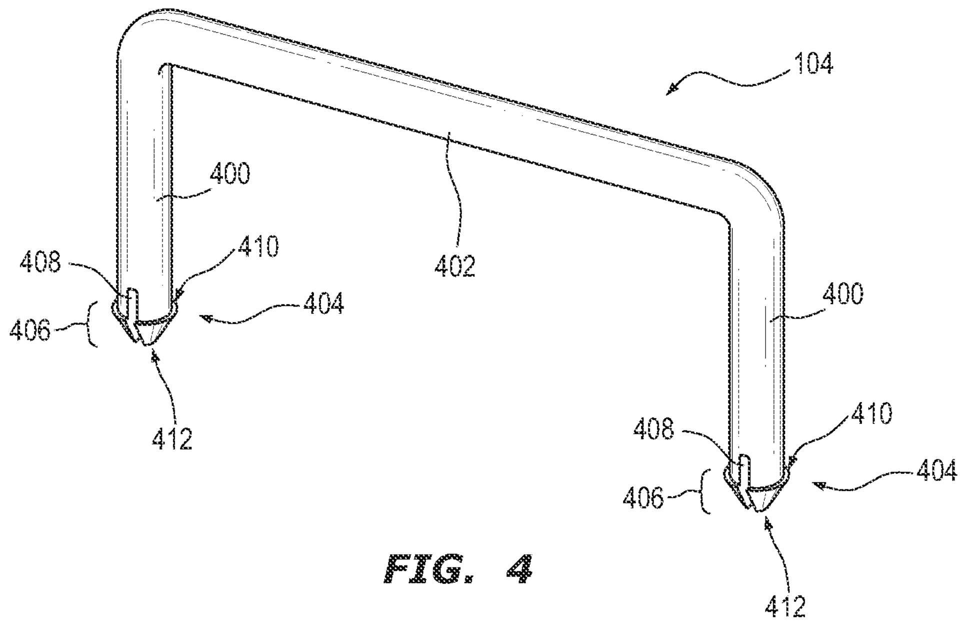
FIG. 4 illustrates an example handle of a wheel chock in accordance with one or more examples of the present disclosure.

FIG. 4 illustrates an example of the handle 104 of the wheel chock 100 in accordance with one or more examples of the present disclosure. As shown, the handle 104 includes upright members 400 and a crossbar 402. The upright members 400 can include straight, rigid members for moving in and out of—specifically up and down relative to—the body portion 102 (e.g., between fixed handle positions). In addition, the crossbar 402 can include a rigid horizontal member perpendicularly adjoining the upright members 400. In these or other examples, the handle 104 can include a same or similar material as the body portion 102. In certain examples, the handle 104 includes the high visibility material 126.

Other alternatives of the handle 104 are herein contemplated. For example, one or more portions of the upright members 400 and the crossbar 402 can be at least partially flexible or non-rigid (e.g., as with a chain core, rope core, or cable core discussed below in relation to FIGS. 14A-14C). Further, and as also described below in relation to FIGS. 14A-14C, the handle 104 can include additional portions, such as a sheath or cover (e.g., to impart at least one of rigidity, comfort, ergonomics, etc.).

In addition, the handle 104 can include a compressible tip 404. The compressible tip 404 can be positioned at each end portion of the upright members 400 opposite of the end portion adjoined to the crossbar 402. In some examples, the compressible tip 404 includes a tapered portion 406. The tapered portion 406 can include a mechanical stop 410 (e.g., a circumferential lip or protrusion) at the wide end and a tip end 412 at the narrow end.

As will be discussed more below in relation to subsequent figures, the mechanical stop 410 can be positioned adjacent to or abut an interior of the body portion 102 (when the handle 104 is attached to the body portion 102 and the handle 104 is in the raised position). Additionally, via the size and shape of the mechanical stop 410, the tapered portion 406 can include an interference fit relative to the apertures 114 to inhibit removal of the handle 104 from the body portion 102 once inserted through the apertures 114. Specifically, the mechanical stop 410 can, when the compressible tip 404 is uncompressed, include a diameter larger than the diameter of the apertures 114.

In these or other examples, the compressible tip 404 defines a slot 408 (e.g., a through-slot) allowing the compressible tip 404 to be compressed or deformed when inserted or press-fit through the apertures 114. The slot 408 can extend longitudinally along a central axis of each of the upright members 400, beginning at the tip end 412 and extending toward the mechanical stop 410. In some examples, the slot 408 extends beyond the mechanical stop 410 and is thus further defined by a body portion of the upright members 400.

In certain examples, the width and/or the length of the slot 408 can affect a rigidity of the compressible tip 404. For instance, wider and/or longer dimensions of the slot 408 can lend to increased flexibility (i.e., increased ease of compressibility) for the compressible tip 404. In contrast, narrower and/or shorter dimensions of the slot 408 can lend to increased rigidity (i.e., decreased ease of compressibility) for the compressible tip 404. Thus, the size and shape of the slot 408 can be tuned to achieve the desired amount of compressibility for the compressible tip 404. Similarly, the size and shape of the mechanical stop 410 can be tuned to increase a surface area engageable with an interior of the body portion 102 and/or decrease a surface area to compress through the apertures 114 (during attachment of the handle 104 to the body portion 102).

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIG. 4.

Figure 5:
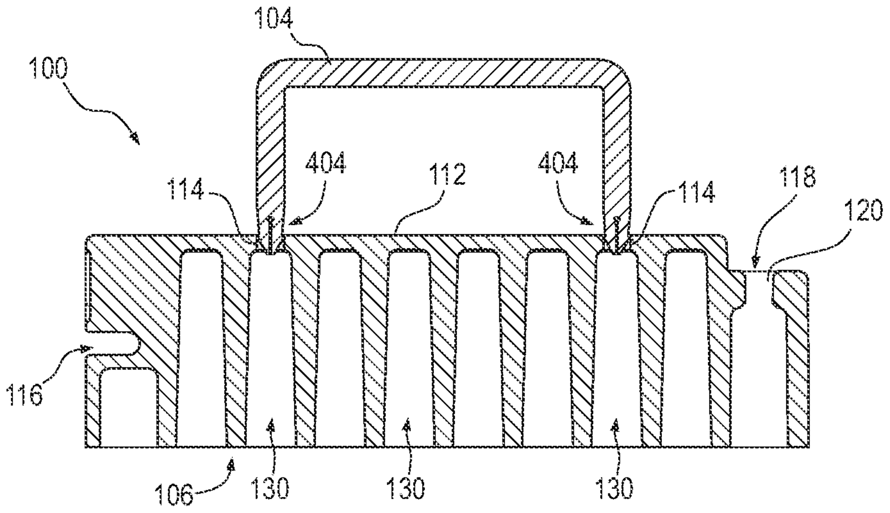
FIG. 5 illustrates a cross-sectional view of a handle being inserted into a body portion of a wheel chock in accordance with one or more examples of the present disclosure.
Figure 6:
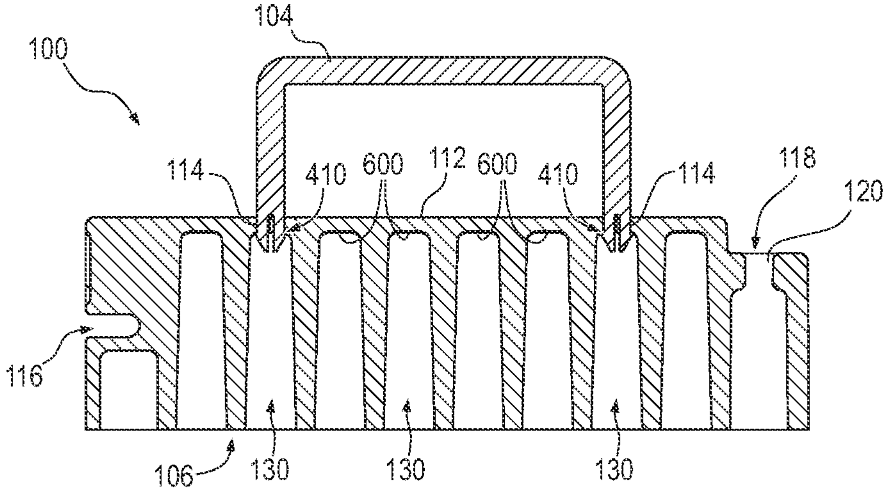
FIG. 6 illustrates a cross-sectional view of a handle in a raised position relative to a body portion of a wheel chock in accordance with one or more examples of the present disclosure.
Figure 7:
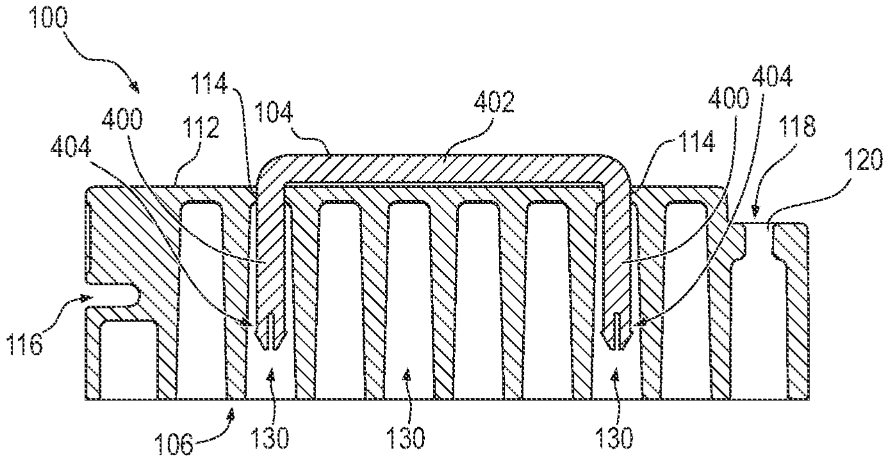
FIG. 7 illustrates a cross-sectional view of a handle in a lowered position relative to a body portion of a wheel chock in accordance with one or more examples of the present disclosure.

FIGS. 5-7 illustrate cross-sectional views of the handle 104 in accordance with one or more examples of the present disclosure. In particular, FIG. 5 illustrates a cross-sectional view of the handle 104 being inserted into the body portion 102 of the wheel chock 100. FIG. 6 illustrates a cross-sectional view of the handle 104 in a raised position relative to the body portion 102. FIG. 7 illustrates a cross-sectional view of the handle 104 in a lowered position relative to the body portion 102.

As shown in FIG. 5, the spine 112 defines the apertures 114 formed in the top surface. Through the apertures 114, the handle 104 can be inserted (e.g., press-fit or slid) into the body portion 102. In so doing, the compressible tip 404 can be compressed or deformed (as shown) to fit inside the apertures 114. For example, the slot 408 of the compressible tip 404 can narrow or be squished tight (i.e., inwardly biased by the aperture sidewalls) such that opposing sides of the compressible tip 404 abut one another. In some examples, the tapered shape of the compressible tips 404 can lend to a smooth insertion of the handle 104 through the apertures 114. As the compressible tips 404 proceed out of the apertures 114 and into the interior of the body portion 102, the compressible tips 404 can decompress and return to an unbiased state (as shown in FIG. 6). In some examples, once the compressible tips 404 are inserted through the apertures 114, the handle 114 is attached (e.g., irremovably attached) to the body portion 102.

In FIG. 6, the handle 104 is in the raised position. When in the raised position, the crossbar 402 is raised or extended above the spine 112 (e.g., for ready user access to grasp or hold the crossbar 402). Additionally or alternatively, the raised position of the handle 104 corresponds to a carrying position for the wheel chock 100.

In some examples, the handle 104 in the raised position can also include a particular positioning of the compressible tips 404. For instance, in the raised position, the compressible tips 404 can be positioned adjacent to or abutting against a top-most interior of the body portion 102 below the spine 112. Specifically, the mechanical stop 410 can engage an interior surface 600 defining the metes and bounds of the core outs 130 between the bottom face 106 and the spine 112. In some examples, the mechanical stop 410 (and/or other portions of the compressible tip 404) can provide a snug fit within a top portion of the core outs 130 due to the tapered geometry of the core outs 130. That is, the compressible tip 404 can easily slide along the interior surface 600 until a tapered top-end of the core outs 130 provides a form fit tailored to the compressible tip 404 (e.g., such that the handle 104 feels rigid and "slop-free" when in the raised position). Further, a more snug fit between the compressible tips 404 and the tapered top-end of the core outs 130 can provide a holding effect for the handle 104 (e.g., such that the handle 104 can independently stay in the raised position without falling back into the body portion 102).

Additionally or alternatively to the mechanical stop 410, the compressible tips 404 can include prongs, wings, knots, swages, cable ties, chain links, fasteners (e.g., nuts, washers, etc.), or other mechanisms to anchor (or stabilize) the handle 104 within the body portion 102. Based on such engagement between the mechanical stop 410 and the interior surface 600, the handle 104 can maintain the raised position relative to the body portion 102 without slipping out of or otherwise withdrawing from the apertures 114.

As discussed above, the handle 104 can be movably attached to the spine 112, thereby allowing translation (or sliding) of the handle 104 up and down relative to the body portion 102. In FIG. 7 (specifically depicting the handle 104 in the lowered position), the handle 104 is slid or pushed down toward the body portion 102 such that the crossbar 402 is positioned adjacent to the spine 112. In addition, in the lowered position, the upright members 400 are positioned below the spine 112, extending into two particular core outs 130. In certain examples, the compressible tips 404 are positioned closer to the bottom face 106 than the spine 112 when the handle 104 is in the lowered position. For instance, the compressible tips 404 may slide down to below a midsection of the body portion 102.

It will be appreciated that the lowered position can be advantageous for chocking a wheel without the handle 104 being in the way of the wheel to be chocked. That is, the lowered position of the handle 104 can correspondingly lower the height profile of the wheel chock 100 compared to a height profile of the wheel chock 100 when the handle 114 is in the raised position. In these or other examples, the handle 104 can return to the raised position by a user grasping the crossbar 402 and pulling upward away from the spine 112 (e.g., until the compressible tips 404 are stopped out at the top-most of the interior surface 600 of the core outs 130).

In one or more alternative examples to the foregoing embodiments, the handle 104 is not movable or slidable relative to the body portion 102. For example, the handle 104 can be a fixed handle (e.g., affixed to the body portion 102 via fasteners, adhesives, bonding, welding, etc.).

Any of the features, components, and/or parts, including the arrangements and configurations thereof shown in FIGS. 5-7 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 5-7.

Figure 10:
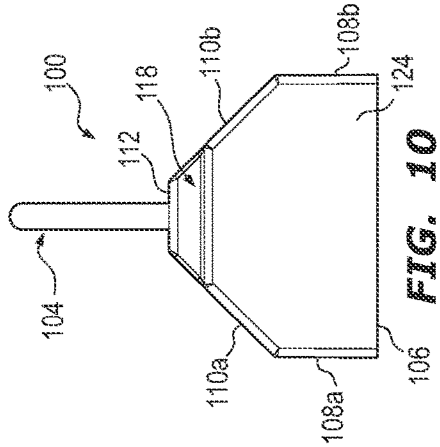
FIG. 10 illustrates a rear view of a wheel chock in accordance with one or more examples of the present disclosure.
Figure 11:
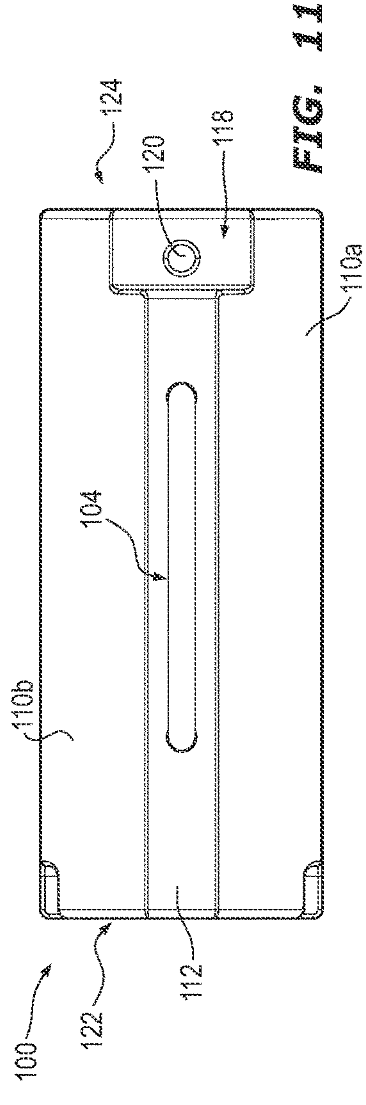
FIG. 11 illustrates a top view of a wheel chock in accordance with one or more examples of the present disclosure.
Figure 8:
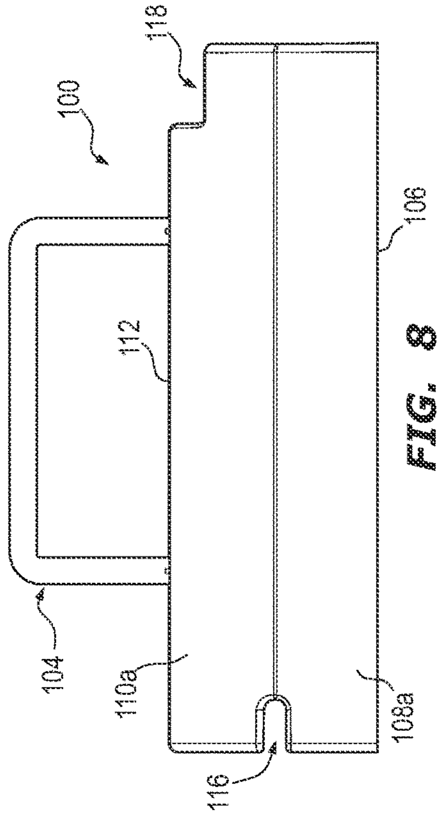
FIG. 8 illustrates a side view of a wheel chock in accordance with one or more examples of the present disclosure.
Figure 9:
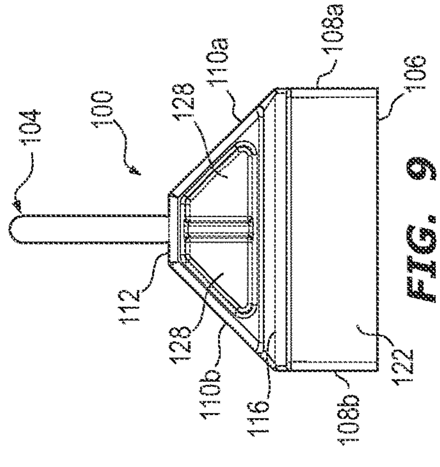
FIG. 9 illustrates a front view of a wheel chock in accordance with one or more examples of the present disclosure.
Figure 12:
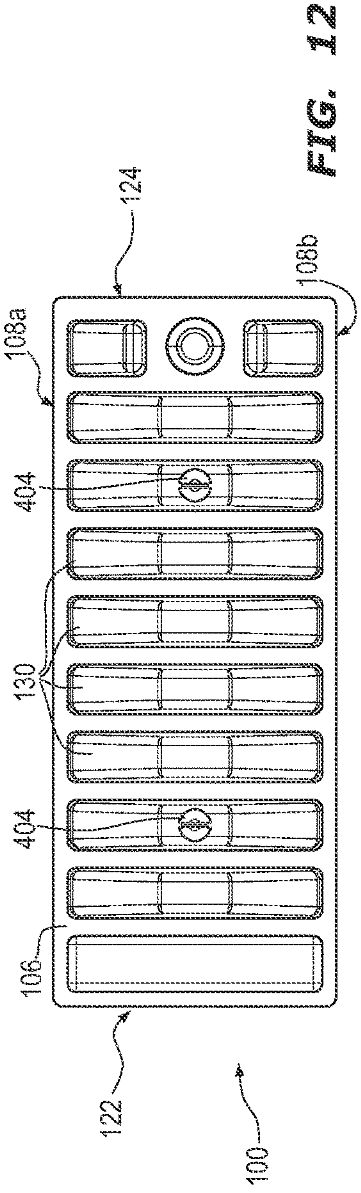
FIG. 12 illustrates a bottom view of a wheel chock in accordance with one or more examples of the present disclosure.

FIGS. 8-12 illustrate additional views (i.e., profile views) of an example wheel chock according to one or more embodiments of the present disclosure. The elements depicted in these figures are described above in relation to the foregoing figures. In particular, FIG. 8 illustrates a side view of the wheel chock 100. FIG. 9 illustrates a front view of the wheel chock 100. FIG. 10 illustrates a rear view of the wheel chock 100. FIG. 11 illustrates a top view of the wheel chock 100. FIG. 12 illustrates a bottom view of the wheel chock 100.

Any of the features, components, and/or parts, including the arrangements and configurations thereof shown in FIGS. 8-12 can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 8-12.

Figure 13:
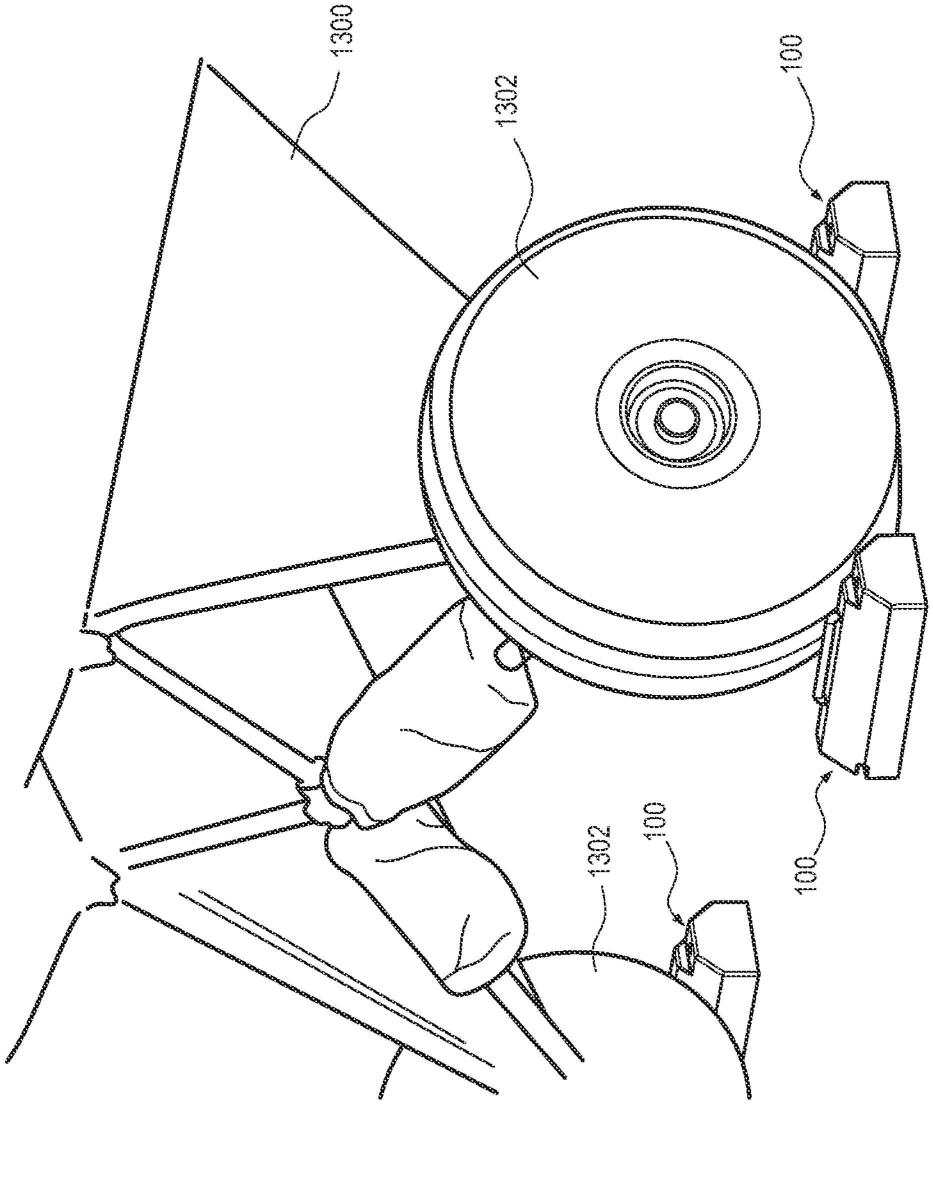
FIG. 13 illustrates an example environment of a wheel chock in accordance with one or more examples of the present disclosure.

FIG. 13 illustrates an example environment of a wheel chock in accordance with one or more examples of the present disclosure. As shown, the wheel chock 100 can be implemented behind and/or in front of a wheel 1302 for an aircraft 1300. In such a position, the wheel chock 100 can prevent the wheel 1302 from rotating past the wheel chock 100. As may be desired, the aircraft 1300 can thus maintain its parked position.

As depicted, the wheel chock 100 is positioned in a chocking position against the wheel 1302. While in the chocking position, the handle 104 can be in the lowered position (as shown). In the lowered position, the handle 104 can remain out of the way of the wheel 1302 to ensure the wheel 1302 is fully seated against the wheel chock 100. However, in some examples, particularly for smaller radius wheels, the handle 104 can remain in the raised position and still not interfere with the wheel 1302 when the wheel chock 100 is in the chocking position.

Furthermore, it will be appreciated that the wheel chock 100 can be implemented with a variety of different vehicles other than an aircraft. For example, the wheel chock 100 can be implemented with an automobile, trailer, tractor, truck, crane, aircraft, and other wheeled vehicles. However, in some cases, the wheel chock 100 can also inhibit movement for non-wheeled vehicles (e.g., track vehicles like snowmobiles, track skid steers, etc.).

Figure 14A:
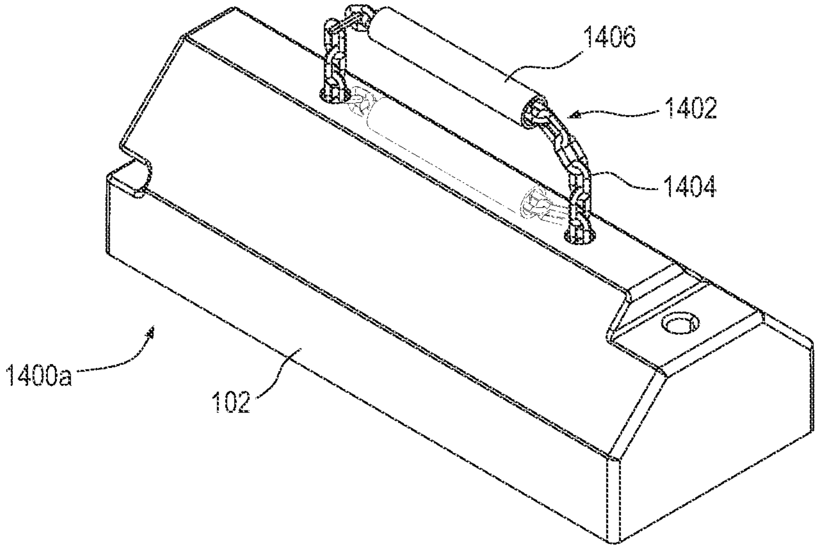
FIGS. 14A-14C respectively illustrate example wheel chocks with a semi-rigid chain handle, a semi-rigid rope handle, and a semi-rigid cable handle in accordance with one or more examples of the present disclosure.
Figure 14B:
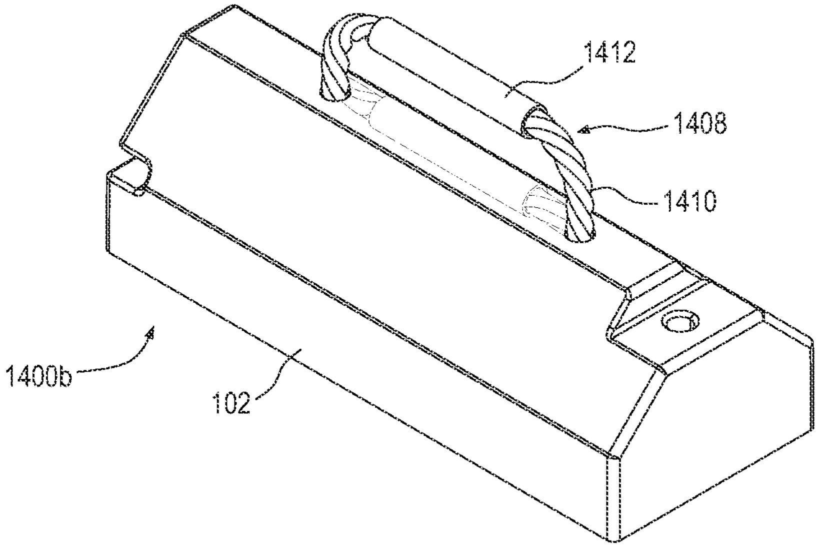
Figure 14C:
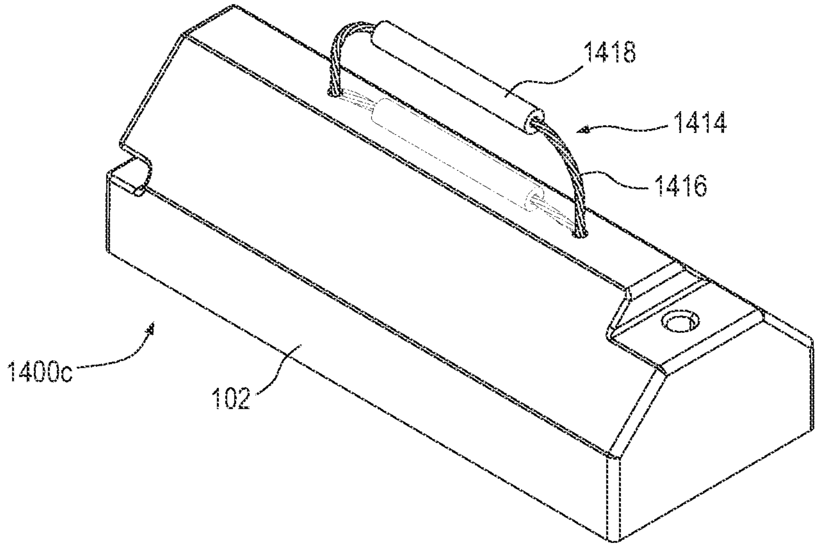

As mentioned above, a wheel chock of the present disclosure can include a variety of different types of handles, including semi-rigid handles. FIGS. 14A-14C respectively illustrate example wheel chocks with a semi-rigid chain handle, a semi-rigid rope handle, and a semi-rigid cable handle in accordance with one or more examples of the present disclosure. In particular, FIGS. 14A-14C respectively illustrate semi-rigid handles 1402, 1408, and 1414 in the raised position for carrying the wheel chock. FIGS. 14A-14C also respectively illustrate the semi-rigid handles 1402, 1408, and 1414 in the lowered position (depicted via dashed lines) when positioning the handles out of the way for placing the wheel chocks in the chocking position against a vehicle wheel.

As shown in FIG. 14A, a wheel chock 1400*a* includes the body portion 102 as described above. In addition, the wheel chock 1400*a* includes a semi-rigid handle 1402. The semi-rigid handle 1402 includes a chain core 1404 and a sheath 1406. The chain core 1404 can include a set of connected chain links (e.g., metal links) attached together in series. In some examples, the chain core 1404 can include a predetermined shape or configuration (e.g., upright members and a crossbar to form a U-shaped configuration). In these or other examples, the chain core 1404 can be moved between the raised and lowered positions (as depicted), such as by pushing downward to push the handle into the interior portion of the wheel chock 1400*a*. In some examples, the chain core 1404 can simply fall to the lowered position, where the weight of the chain core 1404 (particularly chain portions disposed inside the wheel chock 1400*a*) can draw down the semi-rigid handle 1402. It will be appreciated that, in some examples, the chain core 1404 is partially flexible—due to the chain core 1404 being able to at least partially bend, bow, or laterally move as allowed by the individual chain link connections.

The semi-rigid handle 1402 can further include the sheath 1406. The sheath 1406 can at least partially encapsulate or cover the chain core 1404. In some examples, the sheath 1406 entirely encapsulates the chain core 1404. In these or other examples, the sheath 1406 is a rigid, hardened material. The rigid material of the sheath 1406 can allow ergonomic grasping of the semi-rigid handle 1402. In alternative examples, the sheath 1406 is a flexible material, a cushioning material (e.g., a hand cushion for grasping the semi-rigid handle 1402), a foam material, a fabric material, a plastic material, a moldable material, etc. In particular examples, the sheath 1406 includes a high visibility material, as discussed above.

Similarly, as shown in FIG. 14B, a wheel chock 1400*b* includes the body portion 102 as described above. In addition, the wheel chock 1400*b* includes a semi-rigid handle 1408. The semi-rigid handle 1408 includes a rope core 1410 and a sheath 1412. The rope core 1410 can include one or more strands of rope material (e.g., a polypropylene material, a nylon material, a polyester material, a polyethylene material, an aramid material, an acrylic material, etc.). In some examples, the rope core 1410 can include a predetermined shape or configuration (e.g., upright members and a crossbar to form a U-shaped configuration). In these or other examples, the rope core 1410 can be moved between the raised and lowered positions (as depicted), such as by pushing downward to push the handle into the interior portion of the wheel chock 1400*b*. In some examples, the rope core 1410 can simply fall to the lowered position when not in use, particularly if the rope core 1410 includes a smaller diameter than the apertures through which the rope core 1410 extends into the body portion 102. It will be appreciated that, in some examples, the rope core 1410 is partially flexible—due to the rope core 1410 being able to at least partially bend, bow, or laterally move as allowed by the rope strands and flexibility of the rope material. In some examples, the rope core 1410 can be stiffened with coatings or other material.

The semi-rigid handle 1408 can further include the sheath 1412. In these or other examples, the sheath 1412 is the same as or similar to the sheath 1406 discussed above.

Further, as shown in FIG. 14C, a wheel chock 1400*c* includes the body portion 102 as described above. In addition, the wheel chock 1400*c* includes a semi-rigid handle 1414. The semi-rigid handle 1414 includes a cable core 1416 and a sheath 1418. The cable core 1416 can include one or more strands of wire material. In certain examples, the cable core includes a plurality of wires concentrically laid around (or braided about) a center wire. In some examples, the cable core 1416 can include a predetermined shape or configuration (e.g., upright members and a crossbar to form a U-shaped configuration). In these or other examples, the cable core 1416 can be moved between the raised and lowered positions (as depicted), such as by pushing downward to push the handle into the interior portion of the wheel chock 1400*c*. In some examples, the cable core 1416 can simply fall to the lowered position when not in use. It will be appreciated that, in some examples, the cable core 1416 is partially flexible—due to the cable core 1416 being able to at least partially bend, bow, or laterally move as allowed by the cable wire(s) and flexibility and/or gauge of the wire material.

The semi-rigid handle 1414 can further include the sheath 1418. In these or other examples, the sheath 1418 is the same as or similar to the sheath 1406 discussed above.

It will be appreciated that the foregoing embodiments can be modified. For example, the sheaths 1406, 1412, and 1418 can be omitted. Likewise, other materials or types of cores can be utilized. Additionally or alternatively, different sheaths can be utilized in combination with certain cores (e.g., an overmolded nylon rope, where the overmold is stiffer than the nylon rope and provides structural rigidity).

Any of the features, components, and/or parts, including the arrangements and configurations thereof shown in FIGS. 14A-14C can be included, either alone or in any combination, in any of the other examples of devices, features, components, and parts shown in the other figures described herein. Likewise, any of the features, components, and/or parts, including the arrangements and configurations thereof shown and described with reference to the other FIGS. can be included, either alone or in any combination, in the example of the devices, features, components, and parts shown in FIGS. 14A-14C.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not intended to be exhaustive or to limit the examples to the precise forms disclosed.

It will be apparent to one of ordinary skill in the art that many modifications and variations are possible in view of the above teachings. Indeed, various inventions have been described herein with reference to certain specific aspects and examples. However, they will be recognized by those skilled in the art that many variations are possible without departing from the scope and spirit of the inventions disclosed herein. Specifically, those inventions set forth in the claims below are intended to cover all variations and modifications of the inventions disclosed without departing from the spirit of the inventions. The terms "including" or "includes" as used in the specification shall have the same meaning as the term "comprising."

What is claimed is:

1. A wheel chock, comprising:

a body portion comprising:

a bottom face;

a first side face and a second side face extending upward relative to the bottom face;

at least one chocking face positioned above at least one of the first side face or the second side face, wherein the at least one chocking face includes an angled surface; and a spine forming a top surface parallel to the bottom face, the spine adjoined to the at least one chocking face, and the spine defining apertures;

a handle having a rigid portion, the handle being attachable to the body portion via the apertures; and a high visibility material integrally formed with at least one of the body portion or the handle;

wherein each aperture is surrounded by a planar portion to support an interference fit with the handle.

2. The wheel chock of claim 1, wherein the high visibility material includes a pigment having a color luminance greater than 50 percent.

3. The wheel chock of claim 1, wherein the high visibility material includes a chargeable light emissive material comprising at least one of a luminescent material, a phosphorescent material, or a radioluminescent material.

4. The wheel chock of claim 1, wherein the high visibility material includes a coating applied over at least one of the body portion or the handle.

5. The wheel chock of claim 1, wherein the high visibility material includes a discontinuous or weighted application of sprayed or printed material onto at least one of the body portion or the handle.

6. The wheel chock of claim 1, wherein the rigid portion of the handle maintains its shape and configuration.

7. The wheel chock of claim 1, wherein the handle comprises a pair of upright members and a crossbar adjoining the pair of upright members.

8. The wheel chock of claim 7, wherein the pair of upright members comprise a compressible tip.

9. The wheel chock of claim 8, wherein the compressible tip defines a through-slot configured to allow deformation of the compressible tip when inserted through the apertures.

10. The wheel chock of claim 8, wherein the compressible tip comprises a tapered portion that, upon inserting through the apertures, comprises the interference fit relative to the apertures to inhibit removal of the handle from the body portion.

11. The wheel chock of claim 1, wherein the handle comprises a slideable handle configured to slide up and down between a raised position and a lowered position.

12. The wheel chock of claim 11, further comprising a plurality of core outs defined between the bottom face and the top spine, wherein in the lowered position, upright members of the slideable handle respectively reside within two core outs of the plurality of core outs.

13. A wheel chock, comprising:

a base engageable with a support surface;

a first chocking face and a second chocking face positioned above the base, wherein the first chocking face and the second chocking face include angled surfaces;

a spine forming a top surface parallel to the base, the spine adjoining the first chocking face and the second chocking face, and the spine defining apertures; and a chargeable light emissive material positioned across at least one of the first chocking face, the second chocking face, or the spine;

wherein each aperture is surrounded by a planar portion to support an interference fit with a handle.

14. The wheel chock of claim 13, wherein the chargeable light emissive material comprises at least one of a luminescent material, a phosphorescent material, or a radioluminescent material.

15. The wheel chock of claim 13, wherein the chargeable light emissive material comprises a glow-in-the-dark material.

16. The wheel chock of claim 13, further comprising a rigid handle attachable to the spine.

17. A wheel chock, comprising:

a base;

side faces extending upward relative to the base;

a first chocking face and a second chocking face positioned above the side faces, wherein the first chocking face and the second chocking face include angled surfaces;

a spine forming a top surface parallel to the base, the spine adjoining the first chocking face and the second chocking face, and the spine defining apertures;

a slideable handle movably attached to the spine, the slideable handle comprising upright members and a crossbar, and the slideable handle being configured to translate up and down between a raised position and a lowered position, wherein in the lowered position, the upright members are positioned below the spine and the crossbar is positioned adjacent to the spine; and a chargeable light emissive material positioned across at least one of the side faces, the first chocking face, the second chocking face, the spine, or the handle;

wherein each aperture is surrounded by a planar portion to support an interference fit with the handle.

18. The wheel chock of claim 17, wherein the slideable handle comprises a mechanical stop configured to abut an interior portion of the wheel chock below the spine when the slideable handle is in the raised position.

19. The wheel chock of claim 17, wherein;

the spine defines apertures formed in the top surface; and the slideable handle is press fit through the apertures.

20. The wheel chock of claim 17, wherein the chargeable light emissive material is configured to generate a luminous response perceivable to an unaided human eye when the chargeable light emissive material is exposed to temperatures below incandescence, the luminous response being configured to occur during oxidation or after exposure to light or other radiation.

21. A wheel chock, comprising:

a body portion comprising:

a base engageable with a support surface;

at least one chocking face positioned above the base, the at least one chocking face comprising an angled surface relative to the base; and one or more surfaces adjacent to the at least one chocking face, the one or more surfaces extending upward relative to the base;

a top surface parallel to the base, the top surface adjoining the at least one chocking face, and the top surface defining apertures; and a chargeable light emissive material included in at least part of the body portion;

wherein each aperture is surrounded by a planar portion to support an interference fit with a handle.

22. The wheel chock of claim 21, wherein the chargeable light emissive material is included in each of the least one chocking face and the one or more surfaces.

23. The wheel chock of claim 21, wherein the chargeable light emissive material is embedded in the at least part of the body portion.

24. The wheel chock of claim 21, wherein the chargeable light emissive material comprises at least one of a coating, a molding, or a spray-on application disposed over the at least part of the body portion.

* * * * *